United States Patent
Zaiser

(10) Patent No.: US 7,108,077 B2
(45) Date of Patent: Sep. 19, 2006

(54) POWER TOOL

(75) Inventor: Adolf Zaiser, Koengen (DE)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 10/999,694

(22) Filed: Nov. 30, 2004

(65) Prior Publication Data

US 2005/0126803 A1 Jun. 16, 2005

(30) Foreign Application Priority Data

Dec. 1, 2003 (DE) ................ 103 56 068

(51) Int. Cl.
*B24B 7/00* (2006.01)
(52) U.S. Cl. .................. 173/48; 173/49; 173/109; 173/122; 451/344; 451/356
(58) Field of Classification Search ................ 173/109, 173/48, 100, 122, 49, 205, 97; 451/356, 451/357, 270, 163, 344, 453, 351
See application file for complete search history.

(56) References Cited

U.S. PATENT DOCUMENTS

| 2,350,098 | A | * | 5/1944 | Decker ................... 451/356 |
| 4,512,207 | A | * | 4/1985 | Dancsik ..................... 74/44 |
| 5,366,025 | A | * | 11/1994 | Dutschk et al. ............. 173/109 |
| 5,441,450 | A | * | 8/1995 | Fein et al. ................... 451/357 |
| 5,533,925 | A | * | 7/1996 | Sato ............................ 451/344 |
| 5,637,034 | A | * | 6/1997 | Everts et al. ................ 451/344 |
| 5,681,213 | A | * | 10/1997 | Hashii ......................... 451/356 |
| 5,868,208 | A | * | 2/1999 | Peisert et al. ................ 173/178 |
| 5,919,085 | A | * | 7/1999 | Izumisawa ................... 451/357 |
| 5,993,304 | A | * | 11/1999 | Eriksson ...................... 451/356 |
| 6,042,460 | A | * | 3/2000 | Bosten et al. ................ 451/356 |
| 6,926,595 | B1 | * | 8/2005 | Pollak et al. ................ 451/270 |
| 2003/0220058 | A1 | | 11/2003 | Pollak et al. |

FOREIGN PATENT DOCUMENTS

| EP | 0372 376 A2 | 6/1990 |
| GB | 19007 | 0/1908 |
| GB | 219588 | 7/1924 |

* cited by examiner

*Primary Examiner*—Scott A. Smith
(74) *Attorney, Agent, or Firm*—Michael J. Striker

(57) ABSTRACT

A power tool (10) with a housing (12) which accommodates a driven shaft (32) for holding a material-removing tool (40) and which sets the driven shaft into rotary oscillating motion capable of being produced by an eccentric (22) rotating around an axis extending at a right angle to the driven shaft (32), the eccentric engaging in a connecting element coupled with the driven shaft (32), is usable in a more diverse manner because the rotary oscillating motion of the driven shaft (32) and, therefore, the tool (40), is adjustable with a certain travel and is therefore adaptable to special applications.

10 Claims, 2 Drawing Sheets

POWER TOOL

CROSS-REFERENCE

The invention described and claimed hereinbelow is also described in German Patent Application DE 103 56 066.8, filed Dec. 1, 2003. This German Patent Application, whose subject matter is incorporated here by reference, provides the basis for a claim of priority of invention under 35 U.S.C. 119 (a)–(d).

BACKGROUND OF THE INVENTION

The present invention is directed to a power tool.

A power tool s is known from patent EP 372376. Its driven shaft, which is driven such that it rotates and oscillates with small angular displacement, i.e., it is driven in a reciprocating manner, is capable of being coupled with a grinding pad, a special knife or a saw blade, whereby the angle and/or travel of rotation is constant.

To adapt to different working conditions, e.g., materials having different hardnesses, it is only necessary to change the frequency of rotary oscillation.

SUMMARY OF THE INVENTION

The present invention has the advantage that the travel of the rotary oscillations of the driven shaft is adjustable and, as a result, the work output of the power tool when used for sanding, sawing or cutting, for example, is variable with particularly fine precision, thereby markedly expanding the potential usage of the power tool.

Since the distance of the eccentric from the driven shaft is changeable, the travel of the rotary oscillations is capable of being adjusted to a desired value using simple means.

Due to the fact that a connecting element is configured as a fork with two parallel fork prongs with distance between them, the fork prongs extending in a plane transverse to the axis of the driven shaft, it particularly easy to adjust the travel of the rotary oscillations by the fact that the eccentric is supported such that it is longitudinally displaceable relative to the fork prongs and the travel becomes greater the closer the eccentric is to the driven shaft, and it becomes smaller the further the eccentric is positioned between the fork prongs away from the driven shaft, whereby the torque increases as the travel decreases.

Since the running surfaces of the fork prongs in contact with the eccentric are configured as concave grooves, the surface pressure between the eccentric and the running surfaces and, therefore, the wear in this load-transmitting region, is kept low.

Because the eccentric is formed of an eccentric internal spline which is displaceably supported on a splined shaft region of a drive shaft, in particular a motor shaft, adjusting the position of the eccentric along the drive shaft and relative to the fork prongs is particularly simple and reliable.

The internal spline forms a bearing seat of a rolling bearing, the inner race of which encompasses the exterior of the internal spline, and the outer race of which is engaged with the fork prongs, and therefore, a particularly wear-resistant transfer of motion between the eccentric and the driven shaft is possible.

Due to the fact that the eccentric is crowned and, in particular, spherical, in its area of contact with the fork prongs, large surface area contact with minimal wear is possible between the eccentric and the fork.

The eccentric is supported within the enclosure of the fork prongs with minimal play in a longitudinally displaceable, lockable manner, and therefore, it is possible to change the travel of the rotary oscillation in a particularly precise and, in particular, stepless manner.

DETAILED DESCRIPTION OF THE PREFERRED EMBODIMENTS

Figure 1:
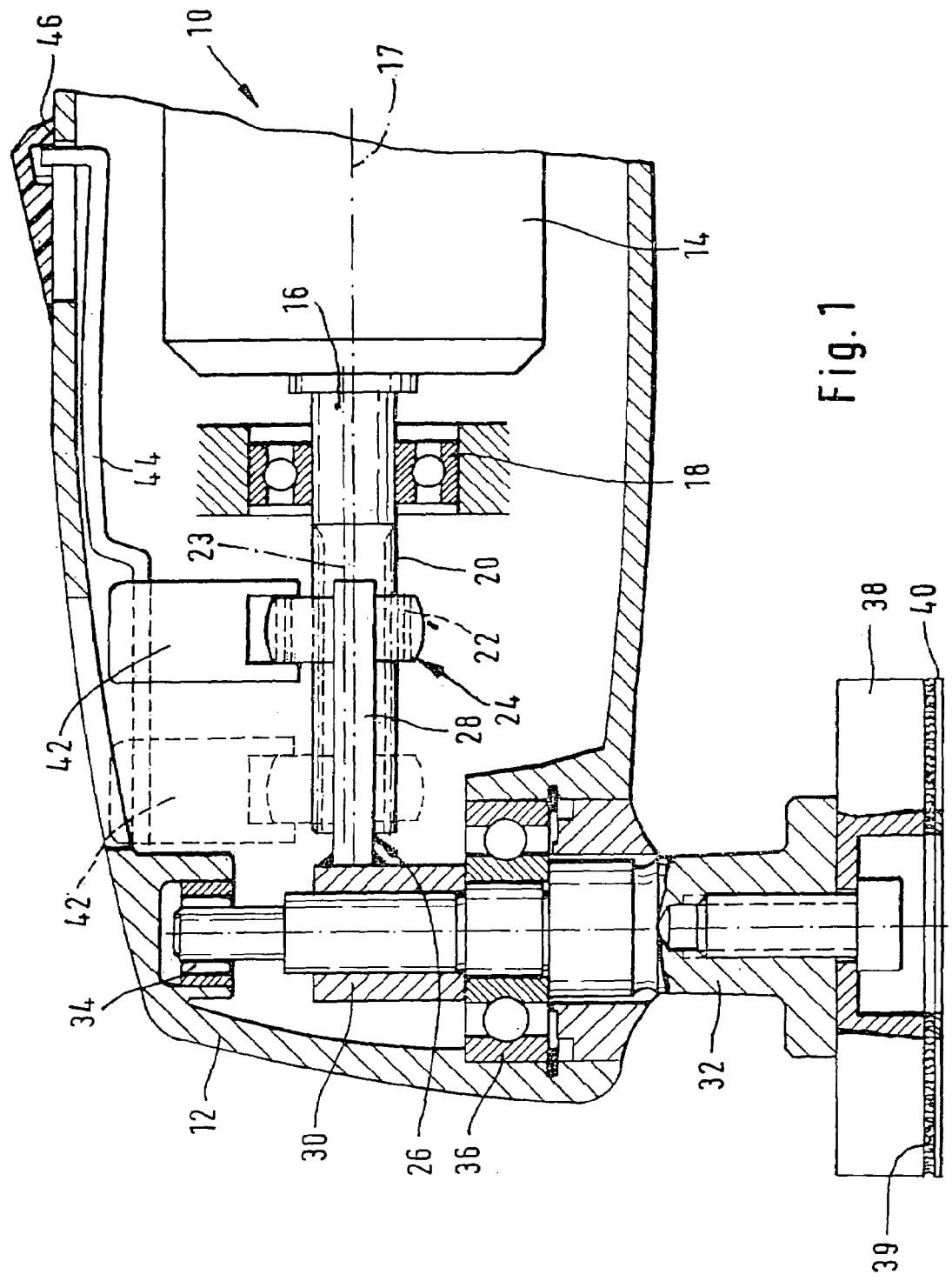
FIG. 1 shows a longitudinal sectional view of a manual grinding machine according to the present invention.

An oscillating sander 10 shown in a partial longitudinal sectional drawing in FIG. 1 includes a longitudinal housing 12 which carries a motor 14 on the end shown on the right, i.e., at the rear, which drives its motor/drive shaft 16 in a rotary manner. Drive shaft 16 carries an eccentric on its free end, which is configured as a splined shaft 20. It is composed of an eccentric ring and/or internal spline 22, the tooth profile and/or teeth 21 of which overlap teeth 19 of splined shaft 20 in a manner free of rotary play in particular, and which is longitudinally displaceable relative to the tooth profile and/or teeth 21, 19.

Drive shaft 16 is supported near splined shaft 20 in a drive shaft bearing 18 which absorbs the load transmission between a rolling bearing 24 and/or its outer race 27 which encompasses internal spline 22, the rolling bearing being guided between two fork prongs 28 of a fork 26.

A driven shaft 32 extends at a right angle to drive shaft 16 with its free end extending out of housing 12 at the bottom; the driven shaft carries fork 26 in its upper region, the fork encompassing driven shaft 32 with a tubular fork stem 30 in a rotation-resistant manner. Two parallel fork prongs 28 extend out of fork stem 30 radially away from driven shaft 32 and parallel to drive shaft 16. Fork prongs 28 encompass outer race 27 of rolling bearing 24, which is positioned eccentrically to splined shaft 20. Rolling bearing 24 moves in a circle around eccentric axis 23 which is offset by an eccentricity e (FIG. 3) relative to axis 17 of drive shaft 16. Driven shaft 32 is rotationally supported in the front region of housing 12 in a needle bearing 34 at the top and in a rolling bearing 36 at the bottom. Driven shaft 32 carries a grinding pad 38 on its lower end, on the underside 39 of which an abrasive sheet 40 is capable of being fastened, using hook-type fasteners in particular. Grinding pad 38 is capable of being replaced with a saw blade or knife, which are not shown.

A driver 42 is supported in the upper region of housing 12 in a manner such that it is longitudinally displaceable parallel to drive shaft 16, the driver encompassing outer race 27 of rolling bearing 24 and being manually displaceable from the outside via a sliding member using a sliding switch 46.

A dashed outline in the far-left position shows how driver 42 has been displaced toward the front using the sliding member on sliding switch 46 and has thereby moved rolling bearing 24 with internal spline 22 on splined shaft 20 into the immediate proximity of driven shaft 32, where the eccentrically rotating motion of rolling bearing 24 is converted to a reciprocating rotary oscillating motion of fork 26 and, therefore, driven shaft 32. In the position indicated with solid lines—the position of rolling bearing 24 far from the fork—the eccentric rotary oscillating motion of bearing 24 is reduced to a rotary oscillating motion of fork 26 with minimal rotary travel.

An ideal travel of fork 26 and, therefore, driven shaft 32—the ideal travel best corresponding to the particular application—can be set using an either stepless or stepped—using detent means, which are not shown—adjustment of sliding button 26.

Figure 2:
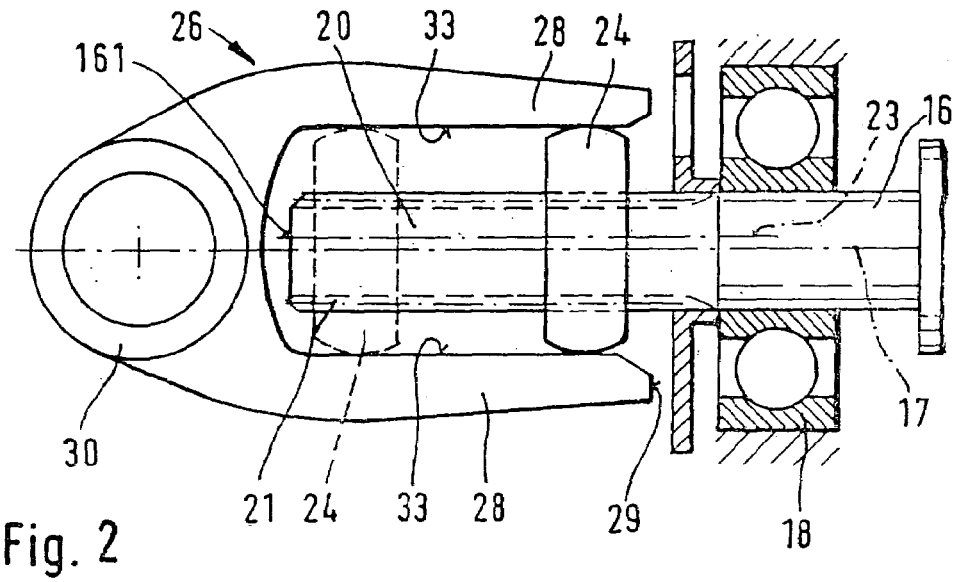
FIG. 2 shows a cross section of the rotary-travel mechanism.

FIG. 2 shows a top view of fork 26, whereby annular fork stem 30 and the two substantially parallel fork prongs 28 are shown clearly, the fork prongs encompassing rolling bearing 24 without play and, due to its eccentric positioning relative to drive shaft 16, perform a reciprocating motion and therefore move the driven shaft in a reciprocating, rotary oscillating manner. When this reciprocating motion takes place, fork prongs 28 bear against outer race 27 of rolling bearing 24 with slight preload. The contour of outer ring 27 is designed spherical in shape, so there is relatively little surface pressure between fork prongs 28 and their running surfaces and outer race 27. As a result, wear between outer race 27 and the running surfaces of fork prongs 28 is relatively minimal.

The eccentric and/or rolling bearing 24, which is shown at the left using dashed lines, is positioned in its closest proximity to driven shaft 32 on shaft end 161 of drive shaft 16. The eccentricity e (FIG. 3) is thereby transferred into a rotary oscillating motion of fork 26 with a maximum angle of rotary oscillation, or travel. In contrast, this travel is smallest when rolling bearing 24 is in the position indicated with solid lines, with internal spline 22 at the ends 29 of fork prongs 28.

Figure 3:
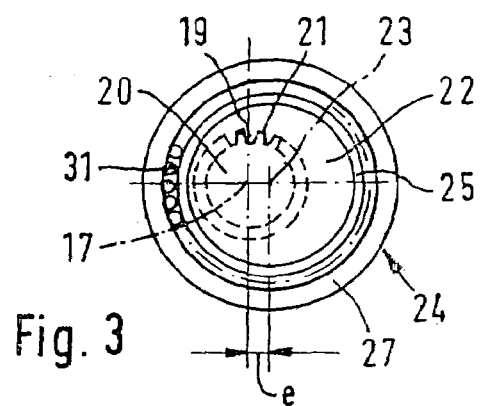
FIG. 3 shows a cross section of the eccentric.

FIG. 3 shows a cross section of splined shaft 20 in the region of internal spline 22 and rolling bearing 24, whereby the tooth profile between splined shaft 20 and internal spline 22 and/or teeth 21, 19 are clearly shown. Moreover, axis 17 of drive shaft 16 and eccentric axis 23 of internal spline 22 are shown as points, and the dimension of eccentricity e is indicated. Furthermore, inner race 25 and outer race 27 of rolling bearing 24, and needles 31 located between them, are shown.

Figure 4:
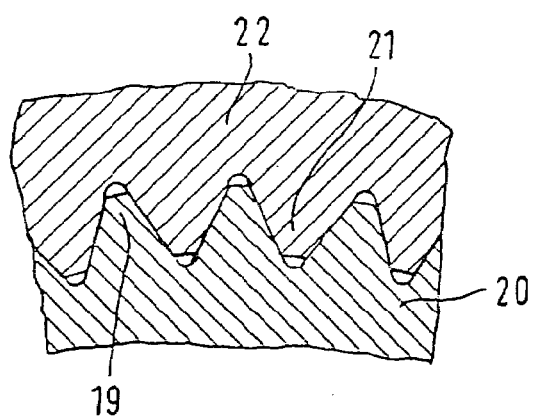
FIG. 4 shows an enlarged cross section of the splined shaft with the internal spline, which forms the eccentric.

FIG. 4 shows an enlarged view of the tooth profile between splined shaft 20 and internal spline 22, and meshed teeth 21, 19, which serve to provide longitudinally sliding guidance and resistance to rotation between internal spline 22 and splined shaft 20.

The invention claimed is:

1. A power tool (10) with a housing (12) which accommodates a driven shaft (32) for holding a material-removing tool (40) and which sets the driven shaft into rotary oscillating motion produced by an eccentric (22) rotating around an axis extending at a right angle to the driven shaft (32), the eccentric engaging in a connecting element coupled with the driven shaft (32), wherein a selected travel of the rotary oscillating motion of the driven shaft (32) and, therefore, of the tool (40), is adjustable, wherein the connecting element is a fork, wherein the fork encompasses the eccentric (22, 24) such that rotation of the eccentric brings about a reciprocating motion of the fork and transfers the reciprocating motion to the driven shaft (32), wherein the eccentric (22, 24) is supported in a longitudinally displaceable, lockable manner in parallel with the fork prongs (28) with minimal play, within an enclosure of the fork (26).

2. The power tool as recited in claim 1, wherein a distance of the eccentric (22, 24) from the driven shaft (32) is changeable.

3. The power tool as recited in claim 1, wherein the a fork has fork prongs, wherein the fork prongs (28) are arranged in parallel in a plane transverse to the axis (17) of the driven shaft (32).

4. The power tool as recited in claim 3, wherein the fork prongs (28) parallel with the driven shaft (32) each form a running surface (33) for the eccentric (22, 24).

5. The power tool as recited in claim 1, wherein the eccentric (22, 24) is capable of being steplessly displaced, actuated externally.

6. The power tool as recited in claim 1, wherein the eccentric (22, 24) is crowned and spherical, in a contact area with the fork (26).

7. The power tool as recited in claim 1, wherein the fork has fork prongs (28), and wherein the fork prongs encompass an outer race (27) of the rolling bearing (24) in a preloaded, elastic, manner.

8. A power tool (10) with a housing (12) which accommodates a driven shaft (32) for holding a material-removing tool (40) and which sets the driven shaft into rotary oscillating motion produced by an eccentric (22) rotating around an axis extending at a right angle to the driven shaft (32), the eccentric engaging in a connecting element coupled with the driven shaft (32), wherein a selected travel of the rotary oscillating motion of the driven shaft (32) and, therefore, the tool (40), is adjustable, wherein the connecting element is a fork having fork prongs, wherein the fork prongs (28) parallel with the driven shaft (32) each form a running surface (33) for the eccentric (22, 24), wherein each running surface (33) forms a concave groove which extends parallel to the drive shaft (16) with a radius of curvature which corresponds to a radius of an outer race (27) of a rolling bearing (24) with an eccentricity of the roller bearing relative to the axis (17) of the drive shaft (16).

9. The power tool as recited in claim 8, wherein the eccentric (22, 24) is formed by an internal spline (22) configured as an eccentric ring, which is displaceably supported with teeth (21) on mating teeth (19) of a splined shaft region (20) of the drive shaft (16).

10. The power tool as recited in claim 9, wherein the internal spline (22) forms a bearing seat for an inner race (25) of the rolling bearing (24), wherein the outer race (27) of the roller bearing is engaged with the fork prongs (28).

* * * * *